(12) United States Patent
Wang

(10) Patent No.: US 6,272,645 B1
(45) Date of Patent: Aug. 7, 2001

(54) METHOD AND CONTROL CIRCUIT FOR WAKING UP A COMPUTER SYSTEM FROM STANDBY MODE

(75) Inventor: Cheng-Chih Wang, Chupei (TW)

(73) Assignee: Windbond Electronics Corp., Hsinchu (TW)

( * ) Notice: Subject to any disclaimer, the term of this patent is extended or adjusted under 35 U.S.C. 154(b) by 0 days.

(21) Appl. No.: 09/191,799

(22) Filed: Nov. 13, 1998

(30) Foreign Application Priority Data

Aug. 12, 1998 (TW) .................................................. 87113260

(51) Int. Cl.$^7$ ...................................................... G06F 1/30
(52) U.S. Cl. ............................................ 713/323; 713/310
(58) Field of Search .................................... 713/300–340

(56) References Cited

U.S. PATENT DOCUMENTS

| | | | |
|---|---|---|---|
| 5,214,785 | * 5/1993 | Fairweather | 713/321 |
| 5,574,920 | * 11/1996 | Parry | 713/340 |
| 5,752,050 | * 5/1998 | Hernandez et al. | 713/330 |
| 5,799,196 | * 8/1998 | Flannery | 713/320 |
| 5,878,264 | * 3/1999 | Ebrahim | 713/323 |
| 5,887,131 | * 3/1999 | Angelo | 713/202 |
| 5,962,930 | * 10/1999 | Cluff et al. | 307/66 |
| 6,041,413 | * 3/2000 | Wang | 713/202 |
| 6,052,793 | * 4/2000 | Mermelstein | 713/340 |

* cited by examiner

Primary Examiner—Paul R. Myers
(74) Attorney, Agent, or Firm—Jiawei Huang; J.C. Patents

(57) ABSTRACT

An operation mode for waking up a system predetermined by a user is stored before the system is in standby mode. After the system is in standby mode, the peripherals and the peripheral controller are separated to prevent the peripheral controller from receiving the output signal from the peripherals. The wake-up control circuit then receives the output signal from the peripherals. In the standby mode, if the output signal from the peripherals is consistent with the user's predetermined operation mode, the system is woken up by the wake-up control circuit and returns to the normal operation mode.

9 Claims, 4 Drawing Sheets

METHOD AND CONTROL CIRCUIT FOR WAKING UP A COMPUTER SYSTEM FROM STANDBY MODE

CROSS-REFERENCE TO RELATED APPLICATION

This application claims the priority benefit of Taiwan application serial no. 87113260, filed Aug. 12, 1998, the full disclosure of which is incorporated herein by reference.

BACKGROUND OF THE INVENTION

1. Field of the Invention

This invention relates in general to a kind of power management and control circuit of a computer system, and more specifically relates to a wake-up control circuit used to wake a personal computer or work station when the micro processor is in standby mode. The invention further specifically relates to a wake-up control circuit to wake up a computer by using the peripherals rather than the panel switch.

2. Description of Related Art

The Macintosh personal computer manufactured by Apple Computer Inc. of Cupertino, Calif., uses specified keys on the keyboard to turn the computer on or off. The method is very convenient.

On the other hand, Intel Corporation of Santa Clara, Calif., provides a specification for a personal computer, called The ATX specification. In the ATX specification, power is no longer controlled by a mechanical switch. The ATX specification manages and controls the power of the whole computer system by a control chipset within the computer. This is a soft power control concept, which uses various methods to turn the computer on or off and is not limited to mechanically switching the power on or off.

As an example of ATX specification version 2.01, the standby power 5VSB is DC 5V, which provides a maximum output current of 0.7A in order to drive the basic power management circuit of a computer system in the power-off state. The management circuit can be set up to process various convenient functions. For example, the system can be set up in advance so that the system can be activated at a predetermined time at night.

Intel, Microsoft and Toshiba, which define different standby modes between operation and power-off of a computer system, provide a specification of an advanced configuration and power interface (ACPI). The computer decides an appropriate standby mode for saving power according to the amount of tasks the computer has. In accordance with the amount of power saving, from small to large, there are four standby modes, which are $S_1$:stop CPU clock, S2:suspend to RAM,S3:suspend to disk and S4: soft off. When the computer is in the mode of suspending to RAM, the S2 mode, the clock pulses on the mainboard other than the real-time clock are all suspended; therefore, all tasks are stopped because no clocks are inputted to the CPU and other circuits. When the user tries to wake up the computer, the user cannot wake up the computer system by a keyboard controller or infrared controller (or serial port) because all of the peripherals are suspended. Under these conditions, the user has to push a button to inform the computer to resume operations. Accordingly, the conventional computer system can not be woken up by its peripherals.

SUMMARY OF THE INVENTION

In accordance with the foregoing description, an object of this invention is to provide a solution to wake up a computer system from standby mode based on the current ACPI specification.

Another object of this invention is to provide a wake-up control circuit, which wakes up a computer system from standby mode. The wake-up control circuit has to separate the input/output buffer at the original peripheral circuit, which prevents receiving abnormal signal when the computer system returns to operation mode. Furthermore, the output signal of the wake-up control circuit must couple to the output signal of a button on a panel to form Wire-And (the input signal of the chipset is assumed to Active-Low).

According to the object mentioned above, a wake-up control circuit used to wake up a computer system from standby mode by peripherals is provided. This control circuit couples between a chipset on the mainboard of the computer, at least one peripheral controller, and external peripherals, and is built into the computer. The control circuit comprises at least an input/output buffer, a decoder, a control register, a data register, a comparator and an AND logic gate. The input/output buffer is coupled between the peripherals and the peripheral controller in order to buffer the output signal. When the input/output buffer is enabled, the peripherals and the peripheral controller are separated, and when the input/output buffer is disabled, the peripherals can communicate with the peripheral controller each other. When the decoder couples to the peripherals is enabled, the decoder receives and decodes the output signal from the peripherals. The control register coupled to the mainboard for temporarily storing computer system control data controls the input/output buffer and the decoder according to the control data. The comparator coupled to the decoder and the data register is used to compare the output data of the decoder with a predetermined wake-up mode and then outputs a comparison result signal. The AND logic gate receives the comparison result signal and an output signal from the panel switch of the computer system, and generates a signal which is input into the chipset on the mainboard.

Consequently, the computer system can be woken up and returned to normal operation mode by the peripherals rather than by the panel switch according to the invention. This invention provides a more convenient and friendly method for the user.

According to the object mentioned above, a wake-up method used to wake up a computer system from standby mode by peripherals is provided. The computer system comprises a least a peripheral, a peripheral controller, a wake-up control circuit and a chipset. The method comprises the following steps. Store the user's predetermined operation mode for waking up the computer system before the system is in standby mode. Separate the peripherals and the peripheral controller after the system is in standby mode so that the output signal of the peripherals is received by the wake-up control circuit rather than by the peripheral controller. If the output signal of the peripheral is consistent with the user's predetermined operation mode for waking up the system, the wake-up control circuit wakes up the computer and then brings the system back to the normal operation mode. The peripheral can then communicate with the peripheral controller again.

BRIEF DESCRIPTION OF THE DRAWINGS

While the specification concludes with the claims particularly pointing out and distinctly claiming the subject matter which is regarded as the invention, the objects and features of the invention and further objects, features and advantages thereof will be better understood from the following description made in connection with the accompanying drawings in which:

DESCRIPTION OF THE PREFERRED EMBODIMENT

Figure 1:
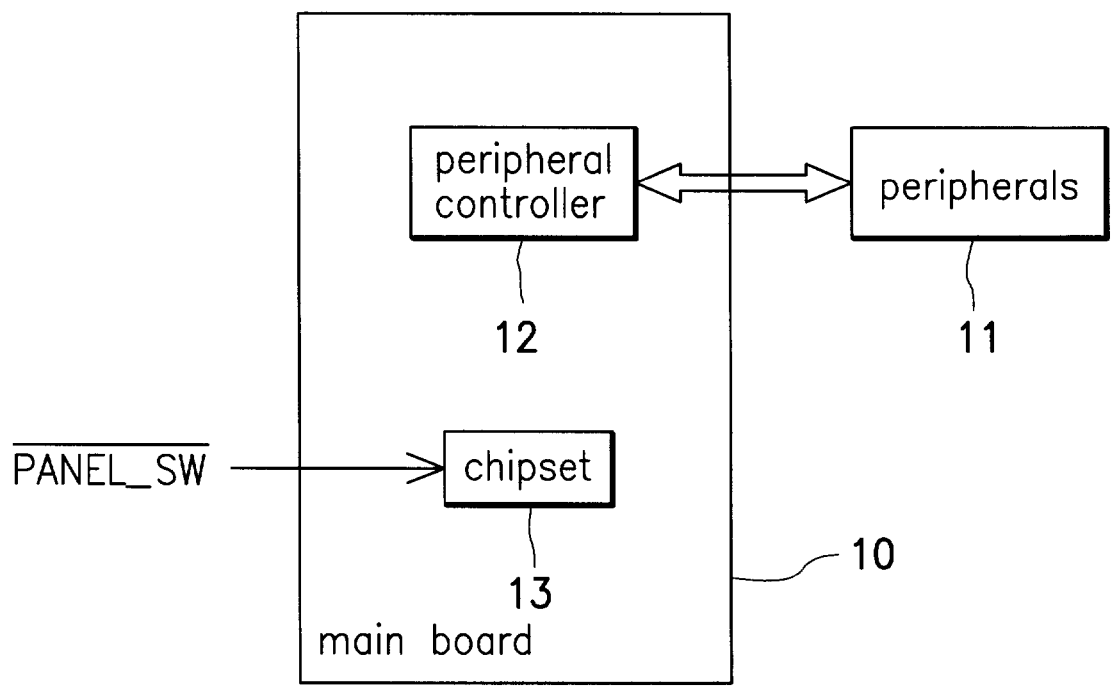
FIG. 1 is a schematic diagram of peripherals and a peripheral controller of a conventional computer system.

FIG. 1 shows a schematic diagram of peripherals 11 and peripheral controller 12 of a conventional computer system. When the computer system is in the mode of suspending to RAM, the peripheral controller 12 (such as a keyboard controller, an infrared controller or serial ports) stop the tasks, the user cannot wake up the computer system by peripherals. Also, When the user tries to wake up the computer system, the user must push a button on the panel to produce signal $\overline{PANEL\_SW}$ and send it to the chipset 13 on a mainboard 10 to command the computer system to return to operation mode. Conventionally, the only method to wake up the computer system is to push the button on the panel when the computer system is in standby mode.

Accordingly, a method and a control circuit used to wake up the system of a personal computer from standby mode are provided.

Figure 2:
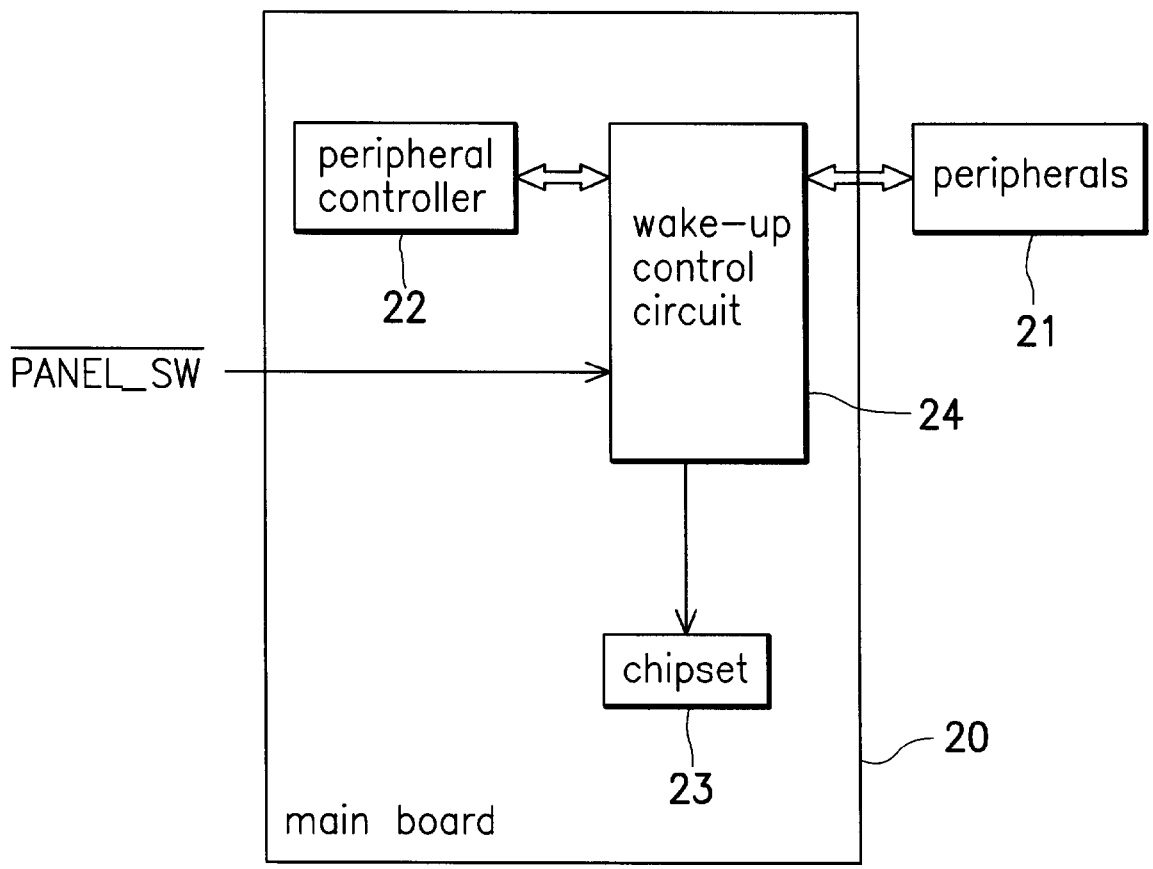
FIG. 2 is a schematic diagram of a wake-up control circuit according to the preferred embodiment of this invention, which illustrates a layout of a peripheral controller, a chipset on a mainboard of a typical computer and an external peripherals.

FIG. 2 shows a schematic diagram of a wake-up control circuit according to the preferred embodiment of this invention. The wake-up control circuit is built within a typical computer system. FIG. 2 also depicts a layout of a peripheral controller, a chipset and external peripherals. The wake-up control circuit 24 coupled between the external peripherals 21 and peripheral controller 22 on the mainboard 20 receives the output signal $\overline{PANEL\_SW}$ and couples to a chipset 23 in order to wake up the computer system from standby mode by the chipset 23. When the computer system operates normally, the wake-up control circuit is in disable mode such that the external peripherals 21 can communicate with the peripheral controller 22. The wake-up control circuit 24 is enabled before the system enters the standby mode, and is then able to separate the peripherals 21 and the peripheral controller 22. Meanwhile, the wake-up control circuit 24 is able to receive the signal from the peripherals, compare it with the predetermined values defined by the user, and then generate a control signal $\overline{PANEL\_SW\_OUT}$ to the input of the chipset 23. If the signal received from the peripherals is consistent with the predetermined values defined by the user, the wake-up control circuit 25 generates the control signal $\overline{PANEL\_SW\_OUT}$ and sends it to the input of the chipset 23. At the same time, the control signal $\overline{PANEL\_SW\_OUT}$ is open-drain and active low in order to command the control circuit 25 to wake up the system, which brings the system back to the normal operation mode. After the wake-up control circuit 24 sends the control signal $\overline{PANEL\_SW\_OUT}$ to the input of the chipset 23, the wake-up control circuit 24 automatically returns to the disable mode and then the peripherals 21 can communicate with the peripheral controller 22 again. In addition, the clock of the wake-up control circuit 24 can be the same as the real-time clock of 32.768 KHz, or can be a low frequency clock generated by the wake-up control circuit 24 itself.

Figure 3:
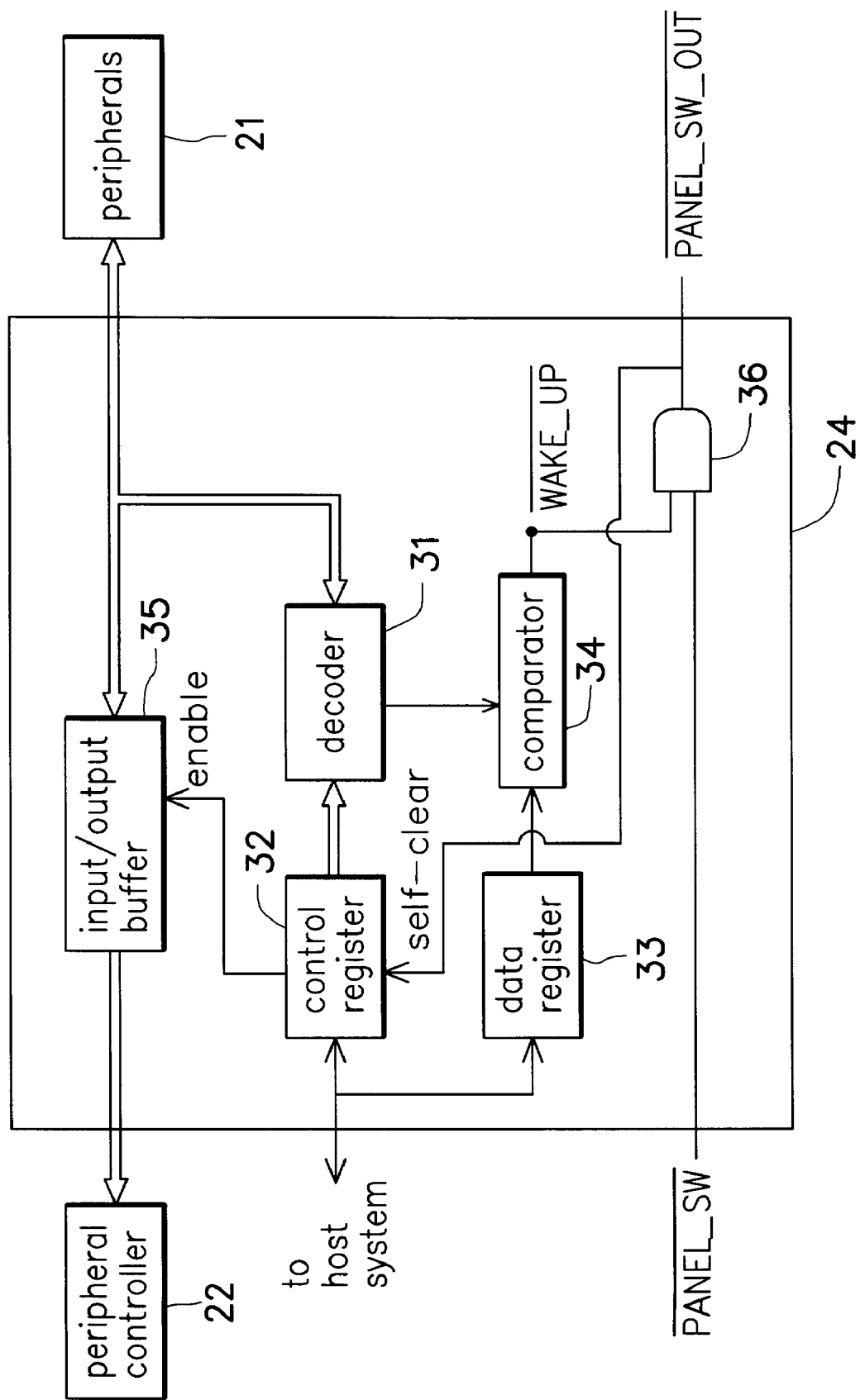
FIG. 3 is a block diagram of the wake-up control circuit according to the preferred embodiment of this invention.

FIG. 3 illustrates the block diagram of a wake-up control circuit 24 according to the preferred embodiment of this invention. The wake-up control circuit 24 comprises a decoder 31, a control register 32, a data register 33, a comparator 34, an input/output buffer 35 and an AND control gate 36. The input/output buffer 35 serves to separate the external peripherals 21 and the peripheral controller 22 in order to prevent the system from receiving abnormal signals as the system returns to the normal operation mode. The host system e nables the control register 32 and stores the user's predetermined value into the data register 33. Meanwhile, decoder 31 is enabled to receive the signal from the peripherals 21. After the computer system enters the standby mode, decoder 31 decodes the signal from the peripherals 21 and then transmits the signal to comparator 34. The comparator 34 compares the decoded signal generated by the decoder 31 with the data stored in the data register 33, and then outputs a comparison result signal $\overline{WAKE\_UP}$. The AND gate 36 receives the output signal $\overline{WAKE\_UP}$ from the comparator 34 and the output signal $\overline{PANEL\_SW}$ generated by the button the panel, after which the AND gate 36 generates a output signal $\overline{PANEL\_SW\_OUT}$ to the input of the chipset 23 (FIG. 2) on the mainboard.

If the decoded signal from the decoder 31 and the user's predetermined value stored in the data register 33 are consistent, then the output signal $\overline{WAKE\_UP}$ of the comparator 34 makes the output signal $\overline{PANEL\_SW\_OUT}$ of the AND gate 36 to be a 0.5–1 second pulse of logic "0", which is able to wake up the computer system by chipset 23. In addition, if the user pushes the button on the panel, by which the output signal $\overline{PANEL\_SW}$ is also a 0.5–1 second pulse of logic "0", which makes the chipset 23 wake up the system and return to the normal operation mode.

According to the foregoing description, after the computer system enters the standby mode, the computer system can be woken up by the external peripherals or by pushing the button on the panel according to the method and the control circuit of this invention. In addition, the user can predetermine the input signal of the peripherals to be certain values of their combinations, by which the computer system is woken up.

Figure 4:
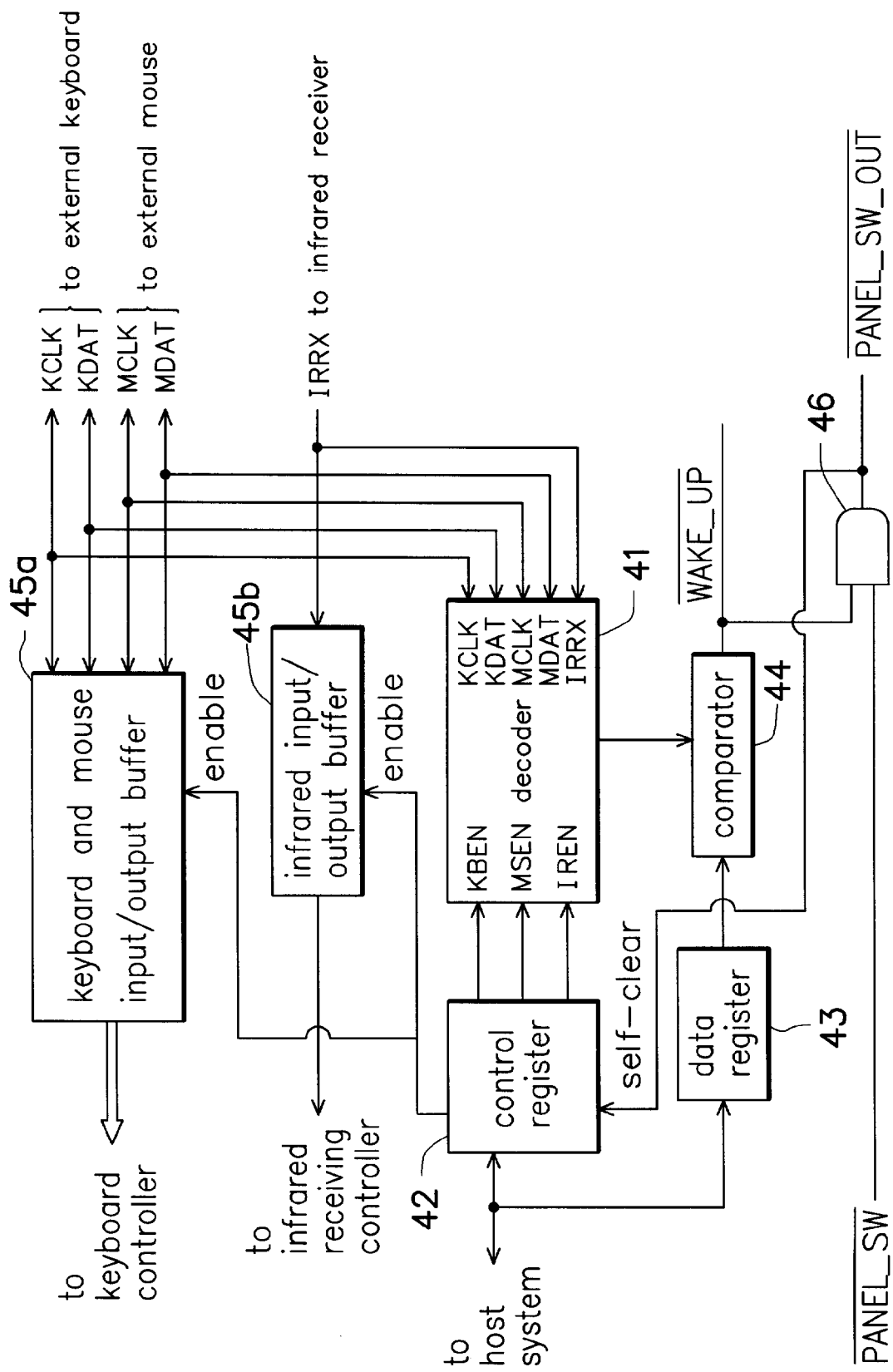
FIG. 4 is a detail circuit diagram of the wake-up control circuit according to the preferred embodiment of this invention.

FIG. 4 illustrates a detailed schematic diagram according to the preferred embodiment of this invention. The wake-up control circuit comprises a decoder 41, a control register 42, a data register 43, a comparator 44, a keyboard and mouse input/output buffer 45a, an infrared 45b input/output buffer, and an AND logic gate. The keyboard and mouse 45a input/output buffer couples between the keyboard and keyboard controller, and between the mouse and the keyboard controller.

Before the computer system enters the standby mode, the host system enables the control register 42, and puts the user's predetermined value into the data register 43. Meanwhile, because the control register is enabled as the input/output buffer of keyboard and mouse 45a is enabled, the keyboard and the keyboard controller are separated and the mouse and the keyboard controller are separated. Also, the infrared 45b input/output buffer is enabled to separate the infrared receiver and the infrared controller, The control register 42 enables the decoder 41 in order to receive the signals from the peripherals. For example, the control register 42 enables the decoder 41 to receive the signals KCLK and KDAT of the external keyboard, the signals MCLK and MDAT of the external mouse and the signal IRRX of the infrared receiver through the signal lines of KBEN, MSEN and IREN, respectively.

After the computer system is in the standby mode, the decoder 41 decodes the signal from the peripherals, such as keyboard, mouse and infrared receiver, and then the decoded signal is sent to the comparator 44. The comparator 44 compares the decoded signal from the decoder 41 with the data stored in the data register 43, and generates a comparison result signal $\overline{\text{WAKE\_UP}}$. The AND gate 46 receives the output signal $\overline{\text{WAKE\_UP}}$ from comparator 44 and the output signal $\overline{\text{PANEL\_SW}}$ by pushing the button on the panel, and generates an output signal $\overline{\text{PANEL\_SW\_OUT}}$ to send to the input of the chipset on the mainboard.

If the decoded signal from the decoder 41 is consistent with the data stored in the data register 43, the output signal $\overline{\text{WAKE\_UP}}$ of the comparator 44 is a 0.5–1 second pulse of logic "0". Therefore, when the decoded signal from the decoder 41 is consistent with the data stored in the data register 43, the output signal $\overline{\text{WAKE\_UP}}$ of the comparator 44 causes the output signal $\overline{\text{PANEL\_SW\_OUT}}$ of the AND gate 46 to be a 0.5~1 second pulse of logic "0". A system wake-up procedure is performed as the chipset receives the signal $\overline{\text{PANEL\_SW\_OUT}}$. In addition, the user can also push the button on the panel to generate 0.5–1 second pulse of logic "0", which causes the chipset to wake up the system so that the system returns to the normal operation mode.

Accordingly, the user can set up a control mode in advance to wake up the system by external peripherals, and store the control mode information into the data register. When the signal inputted by the external peripherals is consistent with the predetermined value defined by the user, the wake-up control circuit controls the chipset to perform a system wake-up procedure. For instance, the user can define a way, such as pushing several special keys simultaneously, clicking all the buttons of the mouse simultaneously, or receiving a certain data by infrared receiver, to serve as the command to wake up the computer system.

According to the wake-up control circuit provided by the preferred embodiment of this invention, the method for waking up a computer system from standby mode comprises the following steps:

Step 1: The user predetermines the operation mode for waking up the system before the system is in standby mode. For example, before the system is in standby mode, the user's predetermined operation mode for waking up the system is stored into the data register of the wake-up control circuit.

Step 2: After the computer system is in standby mode, the wake-up control circuit separates the peripherals and the peripheral controller to prevent the output signal of the peripherals from transmitting to the peripheral controller, and then receives the output signal from the peripherals. For example, after the computer system is in standby mode, the control register of the wake-up control circuit is activated to enable the input/output buffer, by which the peripherals and the peripheral controller are separated and the output signal from the peripherals is sent to the decoder of the wake-up control circuit rather than the peripheral controller.

Step 3: If the output signal from the peripherals is consistent with the user's predetermined operation mode for waking up the system, the wake-up control circuit then wakes the system up and bring the system back to the normal operation mode. Meanwhile, the peripherals and the peripheral controller can communicate with each other again. For example, the comparator of the wake-up control circuit compares the output signal of the decoder with the data stored in the data register. If the compared result is consistent, the system is woken up through the chipset. The system clears the control register such that the decoder does not receive the output signal from the peripherals, and disables the input/output buffer to recover the connection between the peripherals and the peripheral controller.

Consequently, according to the invention, the computer system can be woken up and returned to the normal operation mode by the peripherals rather than by the panel switch. This invention provides a more convenient and friendly method for the user.

While the present invention has been described with a preferable embodiment, this description is not intended to limit the invention. Various modifications of the embodiment will be apparent to those skilled in the art. It is therefore intended that the appended claims will cover any such modifications or embodiments as fall within the true scope of the invention.

What claimed is:

1. A wake-up control circuit, comprising:
    an input/output buffer coupled between a peripheral and a peripheral controller for buffering an output signal from the peripheral, wherein the peripheral and the peripheral controller are separated when the input/output buffer is enabled, and the peripheral and the peripheral controller communicate with each other when the input/output buffer is disabled;
    a decoder coupled to the peripheral, wherein the decoder receives and decodes the output signal from the peripheral as the decoder enables;
    a control register coupled to a host system, the decoder and the input/output buffer for temporarily storing computer system control data and controlling the input/output buffer and the decoder in response to the control data;
    a data register coupled to the host system for temporarily storing wake-up data;
    a comparator coupled to the decoder and the data register for comparing the wake-up data with the output signal from the decoder, and outputting a comparison result signal; and
    an AND gate for receiving the comparison result signal and an output signal from the panel switch of the computer system, and generating a signal to the control register.

2. The wake-up control circuit of claim 1, wherein the input/output buffer comprises a keyboard and a mouse input/output buffer.

3. The wake-up control circuit of claim 1, wherein the input/output buffer comprises an infrared receiver input/output buffer.

4. The wake-up control circuit of claim 1, wherein the input/output buffer comprises a keyboard and a mouse input/output buffer and an infrared receiver input/output buffer.

5. A wake-up control circuit, built into a computer system and coupled between a chipset of the computer system, a peripheral controller and an external peripheral, the wake-up control circuit comprising:
    an input/output buffer coupled between the peripherals and the peripheral controller for buffering an output signal from the peripheral;
    a decoder coupled to the peripheral, for receiving and decoding the output signal from the peripheral;
    a control register coupled to a host system, the decoder and the input/output buffer for storing temporarily storing computer system control data of the computer system controlling the input/output buffer and the decoder in response to the control data;

a data register coupled to the host system for storing temporarily storing wake-up data;

a comparator coupled to the decoder and the data register for comparing the wake-up date with the output signal from the decoder, and outputting a comparison result signal; and an AND gate for receiving the comparison result signal and an output signal from the panel switch of the computer system, and generating a signal to the control register and the chipset of the computer system.

6. The wake-up control circuit of claim 5, wherein the input/output buffer comprises a keyboard and a mouse input/output buffer.

7. The wake-up control circuit of claim 5, wherein the input/output buffer comprises an infrared receiver input/output buffer.

8. The wake-up control circuit of claim 5, wherein the input/output buffer comprises a keyboard and a mouse input/output buffer and an infrared receiver input/output buffer.

9. A method for waking up a computer system from standby mode, wherein the computer system at least comprises a peripheral, a peripheral controller, a wake-up control circuit and a chipset, and the wake-up control circuit at least comprises a decoder, a control register, a data register, a comparator and an input/output buffer, the method comprising the steps of:

storing a user's predetermined operation for waking up the computer system into the data register of the wake-up control circuit before the system is in standby mode;

storing wake-up control data into the control register of the wake-up control circuit;

separating the peripherals and the peripheral controller after the system is in standby mode so that the output signal of the peripherals is received by the decoder of the wake-up control circuit rather than by the peripheral controller;

decoding the output signal from the peripherals by the decoder;

comparing the output signal of the peripherals with the user's predetermined operation for waking up the system by the comparator of the wake-up control circuit, such that if the signal and the predetermined operation are consistent, the wake-up control circuit wakes up the computer system through the chipset;

clearing the control register such that the decoder doesn't receive the output signal from the peripherals; and disabling the input/output buffer in order to reestablish communication between the peripherals and the peripheral controller.

* * * * *